US012626163B2

(12) United States Patent
Liu et al.

(10) Patent No.: US 12,626,163 B2
(45) Date of Patent: May 12, 2026

(54) MODEL PARAMETER SHARING BETWEEN INFERENCE APPLICATION INSTANCES IN PROCESSING UNIT OF INFORMATION PROCESSING SYSTEM

(71) Applicant: EMC IP Holding Company LLC, Hopkinton, MA (US)

(72) Inventors: Jinpeng Liu, Shanghai (CN); Danqing Sha, Shanghai (CN); Zhen Jia, Shanghai (CN); Christopher S. MacLellan, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1130 days.

(21) Appl. No.: 17/217,203

(22) Filed: Mar. 30, 2021

(65) Prior Publication Data

US 2022/0318656 A1    Oct. 6, 2022

(51) Int. Cl.
| | |
|---|---|
| *G06N 5/043* | (2023.01) |
| *G06F 9/50* | (2006.01) |
| *G06F 9/54* | (2006.01) |
| *G06N 20/00* | (2019.01) |

(52) U.S. Cl.
CPC ........... *G06N 5/043* (2013.01); *G06F 9/5016* (2013.01); *G06F 9/544* (2013.01); *G06N 20/00* (2019.01); *G06F 2209/543* (2013.01)

(58) Field of Classification Search
CPC ........ G06N 5/043; G06N 20/00; G06N 3/063; G06F 9/5016; G06F 9/544; G06F 2209/543; G06F 9/50; G06F 9/54
See application file for complete search history.

(56) References Cited

U.S. PATENT DOCUMENTS

| | | | | |
|---|---|---|---|---|
| 11,175,844 B1 * | 11/2021 | Ranjan | ..................... | G06F 3/068 |
| 11,373,119 B1 * | 6/2022 | Doshi | ..................... | H04L 47/70 |
| 11,868,872 B1 * | 1/2024 | Minkin | ..................... | G11C 11/54 |
| 12,093,806 B1 * | 9/2024 | Zejda | ..................... | G06N 3/045 |
| 2018/0203673 A1 * | 7/2018 | Ravishankar | .......... | G06N 5/022 |

(Continued)

OTHER PUBLICATIONS

Exxact Blog, "Discover the Difference Between Deep Learning Training and Inference", Published Aug. 10, 2017, Exxact Corporation (Year: 2017).*

(Continued)

*Primary Examiner* — Kevin L Young
*Assistant Examiner* — Jennifer Marie Gutman
(74) *Attorney, Agent, or Firm* — Ryan, Mason & Lewis, LLP

(57) ABSTRACT

Techniques for model parameter sharing between inference model instances are disclosed. For example, a method performed by a first process obtains a representation of an inference model for which multiple instances of the inference model are to be executed on at least one processing unit. The method determines, from the representation of the inference model, one or more model parameters that are a pre-trained type of model parameter. The method allocates a shared memory for storing the one or more model parameters that are the pre-trained type of model parameter. The method stores the one or more model parameters that are the pre-trained type of model parameter in the shared memory for access by the multiple instances of the inference model to be executed on the at least one processing unit.

20 Claims, 8 Drawing Sheets

(56) References Cited

U.S. PATENT DOCUMENTS

| | | | | |
|---|---|---|---|---|
| 2018/0349313 | A1* | 12/2018 | Ahn | G06F 15/17331 |
| 2019/0324810 | A1 | 10/2019 | Zhao et al. | |
| 2019/0325302 | A1* | 10/2019 | Savic | G06N 3/08 |
| 2020/0012500 | A1* | 1/2020 | Kern | G06F 9/445 |
| 2020/0042856 | A1* | 2/2020 | Datta | G06N 3/045 |
| 2020/0249998 | A1* | 8/2020 | Che | G06N 3/045 |
| 2020/0278888 | A1* | 9/2020 | Connor | G06F 9/5077 |
| 2020/0334083 | A1 | 10/2020 | Liu et al. | |
| 2020/0334544 | A1 | 10/2020 | Liu et al. | |
| 2020/0380374 | A1* | 12/2020 | Foret | G06N 3/105 |
| 2021/0019652 | A1* | 1/2021 | Gadelrab | G06N 3/082 |
| 2021/0034582 | A1 | 2/2021 | Liu et al. | |
| 2021/0158131 | A1* | 5/2021 | Jain | G06N 3/04 |
| 2021/0209450 | A1* | 7/2021 | Cassidy | G06N 3/063 |
| 2021/0224684 | A1* | 7/2021 | Sarkar | G06F 16/907 |
| 2021/0350205 | A1* | 11/2021 | Yan | G06N 3/082 |
| 2022/0092439 | A1* | 3/2022 | Liu | G06N 3/08 |
| 2022/0108209 | A1* | 4/2022 | Pudipeddi | G06F 12/109 |
| 2022/0300826 | A1* | 9/2022 | Chauhan | G06N 3/06 |

OTHER PUBLICATIONS

Dakkak et al., "TrIMS: Transparent and Isolated Model Sharing for Low Latency Deep Learning Inference in Function-as-a-Service", Published 2019, IEEE, 2019 IEEE 12th International Conference on Cloud Computing, pp. 372-382 (Year: 2019).*

Wikipedia, "Intermediate Representation," https://en.wikipedia.org/w/index.php?title=Intermediate_representation&direction=next&oldid=905361000, Jan. 24, 2020, 4 pages.

Jia et al., "Beyond Data and Model Parallelism for Deep Neural Networks," Proceedings of the 2nd SysML Conference, Palo Alto, CA, Jul. 2018, 13 pages.

Wikipedia, "Deep Learning," https://en.wikipedia.org/wiki/Deep_learning, Feb. 6, 2020, 33 pages.

Wikipedia, "Everything as a Service," https://simple.wikipedia.org/wiki/Everything_as_a_service, Aug. 23, 2019, 2 pages.

L. Song et al., "HyPar: Towards Hybrid Parallelism for Deep Learning Accelerator Array," arXiv:1901.02067v1, Jan. 7, 2019, 13 pages.

Github, "OpenNESS Architecture and Solution Overview," https://github.com/open-ness/specs/blob/master/doc/architecture.md, accessed Jul. 7, 2020, 15 pages.

Amazon Web Services, "Machine Learning Inference with AWS IoT Greengrass Solution Accelerator" https://aws.amazon.com/iot/solutions/mli-accelerator/, Oct. 2019, 5 pages.

ETSI, "MEC in 5G Networks," White Paper No. 28, ISBN No. 979-10-92620-22-1, Jun. 2018, 28 pages.

ETSI, "Multi-access Edge Computing (MEC); Phase 2: Use Cases and Requirements," Group Specification MEC 002 V2.1.1, Oct. 2018, 66 pages.

ETSI, "Multi-access Edge Computing (MEC); Framework and Reference Architecture," Group Specification MEC 003 V2.1.1, Jan. 2019, 21 pages.

ETSI, "Multi-access Edge Computing (MEC); Application Mobility Service API," Group Specification MEC 021 V2.1.1, Jan. 2020, 47 pages.

3GPP "3rd Generation Partnership Project; Technical Specification Group Core Network and Terminals; Interface between the Control Plane and the User Plane Nodes; Stage 3," Technical Specification 29.244 V16.2.0, Dec. 2019, 281 pages.

3GPP "3rd Generation Partnership Project; Technical Specification Group Services and System Aspects; System architecture for the 5G System (5GS); Stage 2," Technical Specification 23.501 V16.3.0, Dec. 2019, 417 pages.

3GPP "3rd Generation Partnership Project; Technical Specification Group Services and System Aspects; Procedures for the 5G System (5GS); Stage 2," Technical Specification 23.502 V16.3.0, Dec. 2019, 558 pages.

3GPP "3rd Generation Partnership Project; Technical Specification Group Core Network and Terminals; 5G System; Session Management Policy Control Service; Stage 3," Technical Specification 29.512 V16.3.0, Dec. 2019, 178 pages.

3GPP "3rd Generation Partnership Project; Technical Specification Group Core Network and Terminals; 5G System; Network Exposure Function Northbound APIs; Stage 3," Technical Specification 29.522 V16.2.0, Dec. 2019, 106 pages.

U.S. Appl. No. 16/789,006 filed in the name of Jin Li et al. on Feb. 12, 2020, and entitled "Scheduling Artificial Intelligence Model Partitions Based on Reversed Computation Graph."

U.S. Appl. No. 16/823,445 filed in the name of Jinpeng Liu et al. on Mar. 19, 2020, and entitled "Task Scheduling Method, Electronic Device, and Computer Storage Medium."

U.S. Appl. No. 16/845,682 filed in the name of Jin Li et al. on Apr. 10, 2020, and entitled "Task Processing Method, Electronic Device, and Computer Program Product."

U.S. Appl. No. 16/925,864 filed in the name of Jinpeng Liu et al. on Jul. 10, 2020, and entitled "Managing Artificial Intelligence Model Partitions for Edge Computing Environment."

U.S. Appl. No. 17/105,030 filed in the name of Jinpeng Liu et al. on Nov. 25, 2020, and entitled "Method, System, and Computer Program Product for Deploying Application.".

U.S. Appl. No. 17/132,344 filed in the name of Jinpeng Liu et al. on Dec. 23, 2020, and entitled "User Context Migration Based on Computation Graph in Deep Learning Application on Edge."

* cited by examiner

100

200

| | FUNCTION | MEM(BYTES) | THREADS |
|---|---|---|---|
| 43 | FUSED_NN_CONV2D | 604110848 | 2048 |
| 2 | FUSED_NN_CONV2D_1 | 302088192 | 2048 |
| 13 | FUSED_NN_CONV2D_2 | 151257088 | 2048 |
| 28 | FUSED_NN_CONV2D_3 | 75694080 | 2048 |
| 39 | FUSED_NN_CONV2D_4 | 38273024 | 4096 |
| 42 | FUSED_NN_CONV2D_5 | 19267584 | 4096 |
| 7 | FUSED_NN_CONV2D_6 | 10485760 | 8192 |
| 30 | FUSED_NN_CONV2D_7 | 5505024 | 8192 |
| 37 | FUSED_NN_CONV2D_8 | 4456448 | 16384 |
| 52 | FUSED_ADD_4 | 2098176 | 131072 |
| 40 | FUSED_MULTIPLY_4 | 2098176 | 131072 |
| 35 | FUSED_NN_BIAS_ADD_5 | 2098176 | 131072 |
| 5 | FUSED_NN_RELU_9 | 2097152 | 131072 |
| 48 | FUSED_NN_MAX_POOL2D_4 | 1310720 | 65536 |

300

400

500

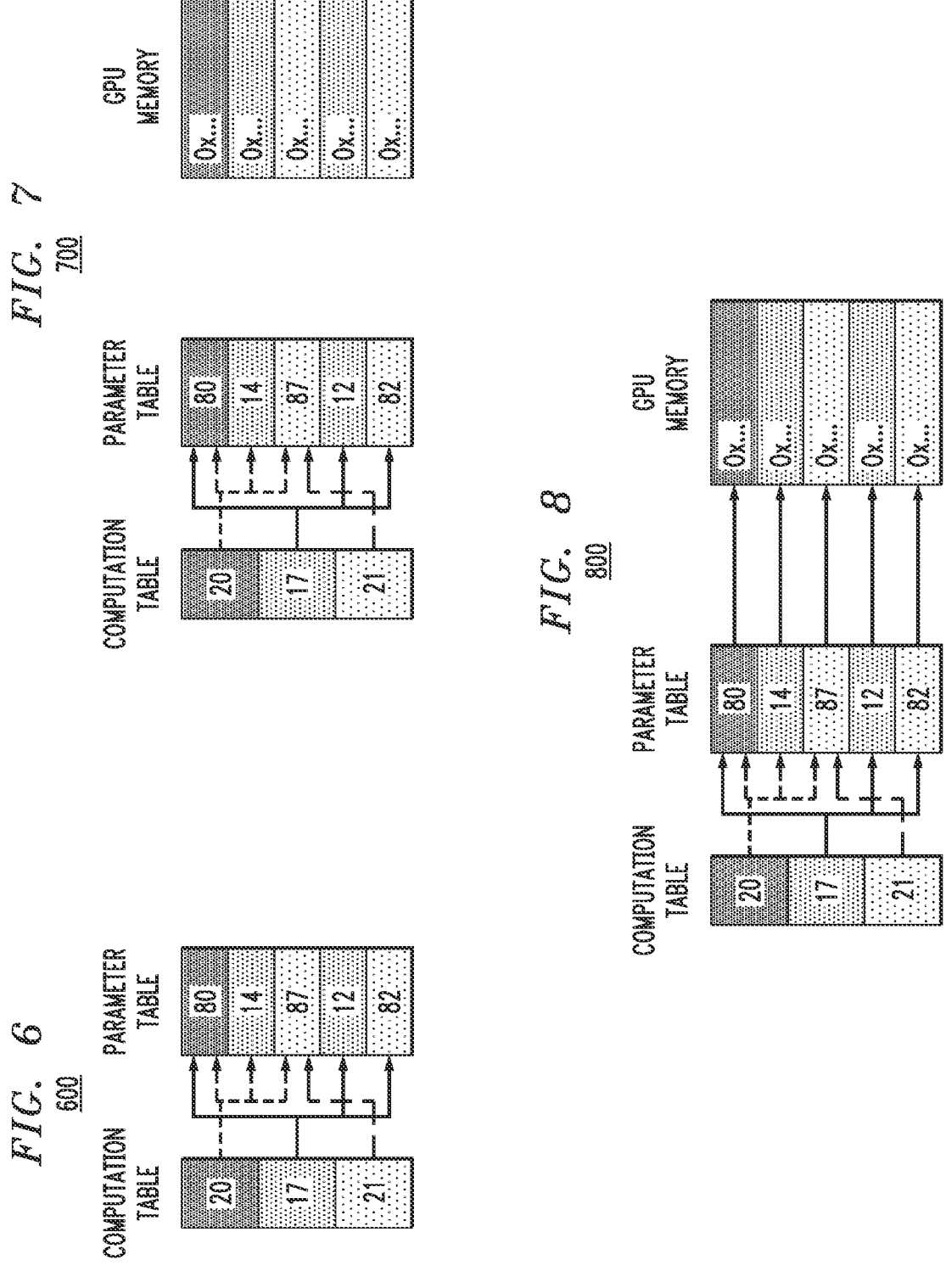

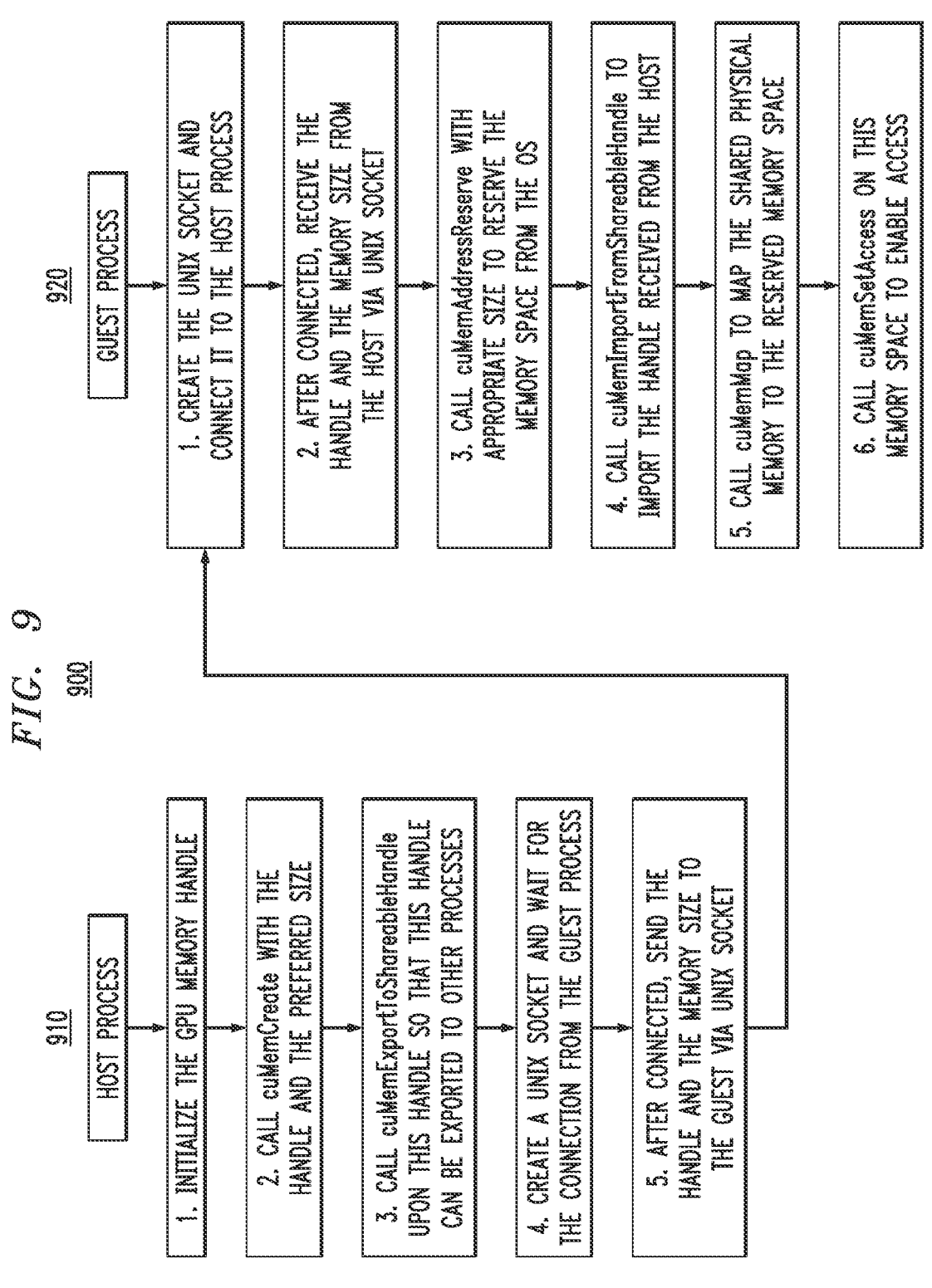

HOST PROCESS — 910

1. INITIALIZE THE GPU MEMORY HANDLE

2. CALL cuMemCreate WITH THE HANDLE AND THE PREFERRED SIZE

3. CALL cuMemExportToShareableHandle UPON THIS HANDLE SO THAT THIS HANDLE CAN BE EXPORTED TO OTHER PROCESSES

4. CREATE A UNIX SOCKET AND WAIT FOR THE CONNECTION FROM THE GUEST PROCESS

5. AFTER CONNECTED, SEND THE HANDLE AND THE MEMORY SIZE TO THE GUEST VIA UNIX SOCKET

GUEST PROCESS — 920

1. CREATE THE UNIX SOCKET AND CONNECT IT TO THE HOST PROCESS

2. AFTER CONNECTED, RECEIVE THE HANDLE AND THE MEMORY SIZE FROM THE HOST VIA UNIX SOCKET

3. CALL cuMemAddressReserve WITH APPROPRIATE SIZE TO RESERVE THE MEMORY SPACE FROM THE OS 4. CALL cuMemImportFromShareableHandle TO IMPORT THE HANDLE RECEIVED FROM THE HOST 5. CALL cuMemMap TO MAP THE SHARED PHYSICAL MEMORY TO THE RESERVED MEMORY SPACE 6. CALL cuMemSetAccess ON THIS MEMORY SPACE TO ENABLE ACCESS

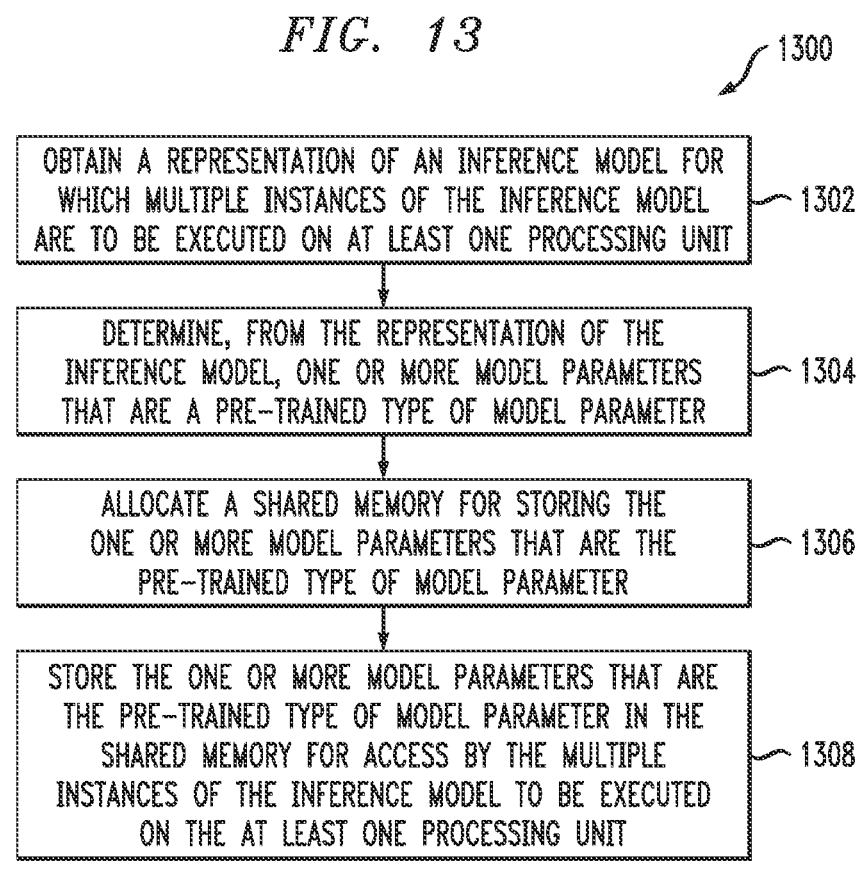

OBTAIN A REPRESENTATION OF AN INFERENCE MODEL FOR WHICH MULTIPLE INSTANCES OF THE INFERENCE MODEL ARE TO BE EXECUTED ON AT LEAST ONE PROCESSING UNIT ‒ 1302

DETERMINE, FROM THE REPRESENTATION OF THE INFERENCE MODEL, ONE OR MORE MODEL PARAMETERS THAT ARE A PRE-TRAINED TYPE OF MODEL PARAMETER ‒ 1304

ALLOCATE A SHARED MEMORY FOR STORING THE ONE OR MORE MODEL PARAMETERS THAT ARE THE PRE-TRAINED TYPE OF MODEL PARAMETER ‒ 1306

STORE THE ONE OR MORE MODEL PARAMETERS THAT ARE THE PRE-TRAINED TYPE OF MODEL PARAMETER IN THE SHARED MEMORY FOR ACCESS BY THE MULTIPLE INSTANCES OF THE INFERENCE MODEL TO BE EXECUTED ON THE AT LEAST ONE PROCESSING UNIT ‒ 1308

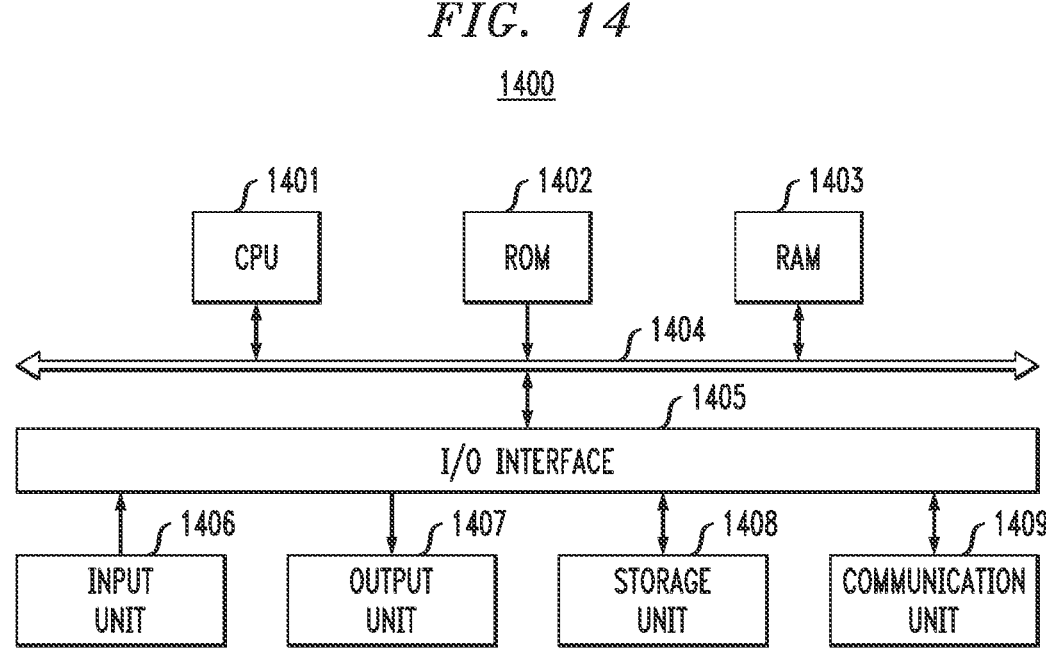

1401 CPU
1402 ROM
1403 RAM
1404
1405 I/O INTERFACE
1406 INPUT UNIT
1407 OUTPUT UNIT
1408 STORAGE UNIT
1409 COMMUNICATION UNIT

MODEL PARAMETER SHARING BETWEEN INFERENCE APPLICATION INSTANCES IN PROCESSING UNIT OF INFORMATION PROCESSING SYSTEM

FIELD

The field relates generally to information processing systems, and more particularly to a artificial intelligence (AI) model management implemented in an information processing system.

BACKGROUND

In recent years, with the progress of artificial intelligence (AI) technology, application programs that employ AI models (such as, but not limited to, machine learning (ML) applications, deep learning (DL) applications, and data mining (DM) applications) have enabled significant development in many fields. Typically, an AI model is initially trained, and an AI inference model (e.g., inference program or inference application) is generated from the trained model. The inference model governs how to make predictions on new data. In some scenarios, multiple instances of the same inference application can be deployed in a computing node to satisfy real-time requirement of the inference application.

SUMMARY

Embodiments provide an artificial intelligence model framework with model parameter sharing between inference application instances in an information processing system such as, but not limited to, an edge computing network.

For example, in an illustrative embodiment, a method for model parameter sharing between inference model instances performed by a first process comprises the following steps. The method obtains a representation of an inference model for which multiple instances of the inference model are to be executed on at least one processing unit. The method determines, from the representation of the inference model, one or more model parameters that are a pre-trained type of model parameter. The method allocates a shared memory for storing the one or more model parameters that are the pre-trained type of model parameter. The method stores the one or more model parameters that are the pre-trained type of model parameter in the shared memory for access by the multiple instances of the inference model to be executed on the at least one processing unit.

In a further illustrative embodiment, the method may further comprise: obtaining, via a second process associated with a given one of the multiple instances of the inference model, the representation of the inference model; determining from the representation of the inference model, via the second process, one or more model parameters that are not the pre-trained type of model parameter; allocating, via the second process, a local memory for storing the one or more model parameters that are not the pre-trained type of model parameter; and storing, via the second process, the one or more model parameters that are not the pre-trained type of model parameter in the local memory for the given one of the multiple instances of the inference model.

In yet another illustrative embodiment, the method may further comprise: determining from the representation of the inference model, via the second process, one or more model parameters that are the pre-trained type of model parameter; and accessing, via the second process, the shared memory created by the first process and obtain the one or more model parameters that are the pre-trained type of model parameter.

Advantageously, illustrative embodiments differentiate model parameters that are pre-trained (and thus are considered immutable) from model parameters that are not pre-trained (and thus are considered mutable). While each of the multiple inference model instances maintain their own local memory for the mutable parameters, the multiple inference model instances access the same shared memory for the immutable parameters.

These and other illustrative embodiments include, without limitation, apparatus, methods and computer program products comprising processor-readable storage media.

BRIEF DESCRIPTION OF THE DRAWINGS

FIG. 6 illustrates computation and parameter pointer tables associated with a memory management process in an inference framework with which one or more illustrative embodiments can be implemented.

FIG. 7 illustrates allocation of memory for model parameters associated with a memory management process in an inference framework with which one or more illustrative embodiments can be implemented.

FIG. 8 illustrates adjustment of pointers to memory for model parameters associated with a memory management process in an inference framework with which one or more illustrative embodiments can be implemented.

FIG. 9 illustrates a workflow for sharing memory between processes associated with memory management in an inference framework with which one or more illustrative embodiments can be implemented.

FIG. 13 illustrates a methodology for model parameter sharing between inference application instances according to an illustrative embodiment.

FIG. 14 illustrates a processing platform used to implement an information processing system for model parameter sharing between inference application instances according to an illustrative embodiment.

DETAILED DESCRIPTION

Figures 1, 2:
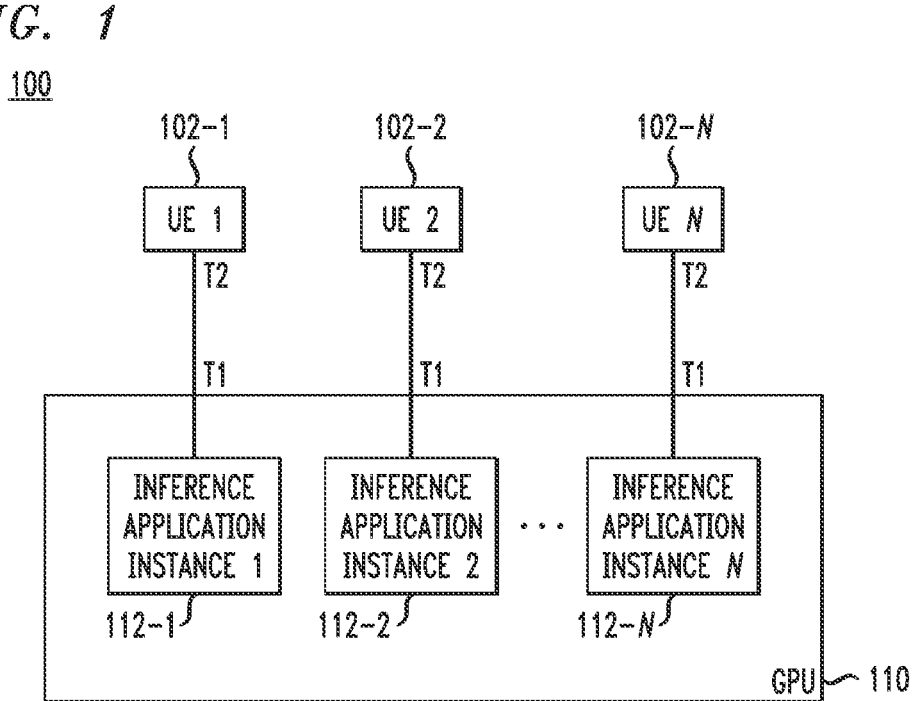
FIG. 1 illustrates a multiple instance deployment of a data parallelism inference application in a processing unit of an edge computing network with which one or more illustrative embodiments can be implemented.
FIG. 2 illustrates memory and computing requirements in a processing unit of an edge computing network with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or same objects. Other definitions, either explicit or implicit, may be included below.

Many different parallelism approaches have been proposed for AI model management. For example, in one parallelism approach, every computing device (machine) in a given network that executes a given application, executes the entire AI model thereon to process a respective part of data. However, the growth of AI models has resulted in a single computing device being unable to execute the entire AI model independently. Thus, the concept of model parallelism has been proposed to execute a large, complicated AI model. For example, model parallelism is when the AI model is split (partitioned) among computing devices such that each computing device works on a part of the AI model. In yet another parallelism approach used for example during training, the entire dataset is split into mini-batches and each mini-batch is trained in a different computing node and gradients are then aggregated.

Some of these proposed techniques are implementable for training of large models in graphic processing units (GPUs) distributed in multiple computing nodes in a cloud computing environment. Furthermore, techniques have been proposed to provide a framework for implementing parallelism in an edge computing environment. Edge computing is a distributed computing paradigm that typically comprises one or more edge servers running one or more application programs that interact with a plurality of heterogeneous computing devices (e.g., X86_64/ARM CPUs (central processing units), FPGAs (field programmable gate arrays), ASICs (application specific integrated circuits), programmable switches, etc.) which are normally computing resource-limited (e.g., limited in terms of processing and/or storage capacities). In addition, edge computing is an emerging technology developing together with emerging 5G (3GPP $5^{th}$ Generation) telecommunication network technology and equipped with many deep learning inference applications for autonomous driving, mobile mixed reality, drone pilot, smart home, Internet of Things (IoT) and virtual reality (VR) games, to name a few. Such applications typically need real-time responses or computing offload from servers, which cannot be adequately fulfilled by current cloud computing infrastructure. Thus, the emergence of edge computing is in response to the inability of centralized data centers to provide real-time or near-real-time compute capabilities to the vast (and growing) sources of decentralized data (so-called data "out in the wild"). Edge computing moves the computer workload closer to the consumer/data generator to reduce latency, bandwidth and overhead for the centralized data center and intermediate switches, gateways, and servers.

Furthermore, with current deep learning frameworks, it is common to deploy several inference instances with the same model inside a processing unit such as a GPU to satisfy the real-time requirements of the application.

In accordance with illustrative embodiments, it is realized herein that sometimes the GPU memory capacity may restrict the number of instances that can be deployed in a GPU. In turn, this can restrict the real-time service quality, especially when the model will occupy too many memory resources. It is further realized herein that deep learning models require many memory resources while requiring relatively few computing (e.g., threads for GPU) resources. Hence, in some cases, only very few inference application instances can be run in a GPU due to the memory capacity restriction, leading to many computing thread resources being wasted.

The Compute Unified Device Architecture (CUDA) toolkit is a parallel computing platform and application programming interface (API) developed by Nvidia Corporation (Santa Clara, CA) which enables Nvidia GPUs to be used for general purpose processing. Since version 10.2 of the toolkit, CUDA has provided an API for low-level virtual memory management and GPU physical memory sharing between processes. One or more illustrative embodiments provide solutions which leverage CUDA features to accommodate as many inference instances in a single GPU as possible to optimally utilize both the memory and computing resources of the GPU for relatively large models by sharing the models (i.e., pre-trained parameters) between inference processes. Advantageously, GPU capacity is multiplied several times by implementing a physical/virtual memory mapping layer without significantly changing the design and implementation of current popular deep learning frameworks.

Assume that in an edge computing network, an inference application (model) simultaneously services many users. By way of example, users may include a plurality of user equipment (UEs) such as, but not limited to, mobile phones or autonomous driving vehicles. From the inference application point of view, all data frames, whether they are coming from the same or different UEs, are independent data samples to be fed to the inference application. Such a use case scenario is an example of data parallelism, as mentioned above.

To satisfy the real-time inference application requirement (for example, in an autonomous driving system, the inference application must send the next step instruction to the vehicle, e.g., to brake to avoid a pedestrian) and the capacity requirement (for example, an inference application may serve many vehicles simultaneously), based on the current deep learning frameworks, a multiple instance deployment of a data parallelism inference can be used in an edge computing network to process the data frames from different UEs in parallel. By way of example, FIG. 1 illustrates at least a portion of an edge computing network 100 wherein a plurality of UEs 102-1, 102-2, . . . , 102-N (herein each individually referred to as UE 102 or collectively as UEs 102) are operatively coupled to an edge processing unit (GPU) 110 which comprises a plurality of instances 112-1, 112-2, . . . , 112-N of a given inference application (herein each individually referred to as inference application instance 112 or collectively as inference application instances 112). As shown, each inference application instance 112 receives and processes data frames (T1, T2, . . . ) from a respective UE 102. In a conventional deployment, the application is a pre-trained model with its parameters, and the application is replicated in each inference instance 112.

Typically, for an inference application, the pre-trained parameters, which are immutable, occupy most of the GPU memory for this model. Note that an immutable data object (data item, data set, data value, etc.) is a data object whose state cannot be modified after it is created. This is in contrast to a mutable object, which can be modified after it is created. For example, consider memory consumption in a processing unit (GPU) of an edge computing network with respect to a 16.6 G (gigabyte) deep learning model. The mutable parameters of the model include the model input, the model output, and the intermediate computing results for each layer of the model. The mutable parameters occupy about 1.9 G memory and the immutable pre-trained parameters occupy about 16.6−1.9=14.7 G memory. Furthermore, FIG. 2 shows table 200 which includes the dynamic requirements of the computing and memory resources in an inference application for a Cifar-10 model. From FIG. 2, it is evident that there are many computations in the Cifar-10 model which require many memory resources but only need relatively few computing threads.

Figure 3:
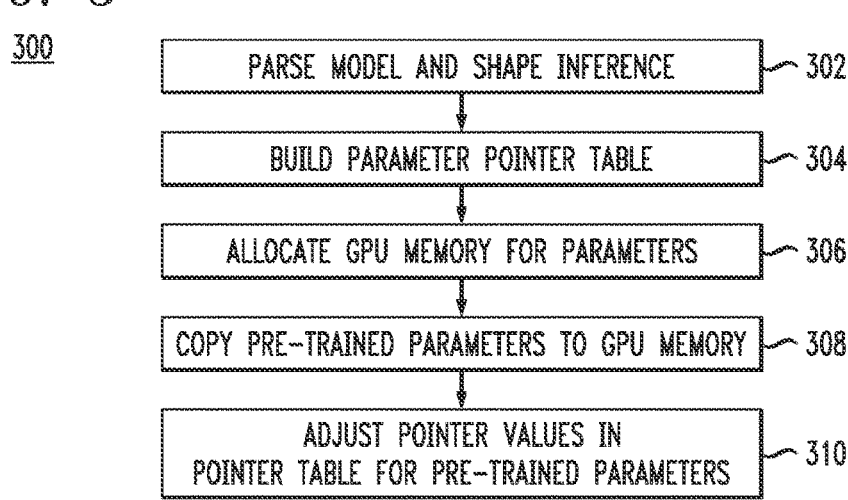
FIG. 3 illustrates a memory management process in an inference framework with which one or more illustrative embodiments can be implemented.

Conventional inference frameworks, such as Tensor Virtual Machine (TVM) and Open Neural Network Exchange (ONNX) Runtime, manage their memory for parameters as illustrated in process 300 of FIG. 3. As shown in process 300, step 302 parses the model and shapes the inference. Step 304 then builds a parameter pointer table. Step 306 allocates GPU memory for the parameters. Step 308 copies pre-trained parameters to GPU memory. Step 310 then adjusts pointer values in the pointer table for pre-trained parameters. Details of the steps of process 300 are further explained below.

Figure 4:
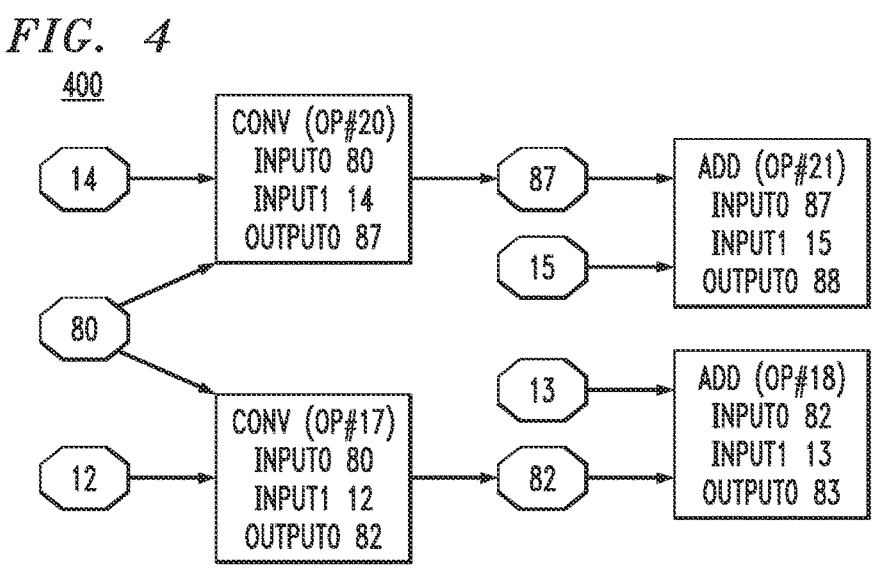
FIG. 4 illustrates a computation graph associated with a memory management process in an inference framework with which one or more illustrative embodiments can be implemented.
Figure 5:
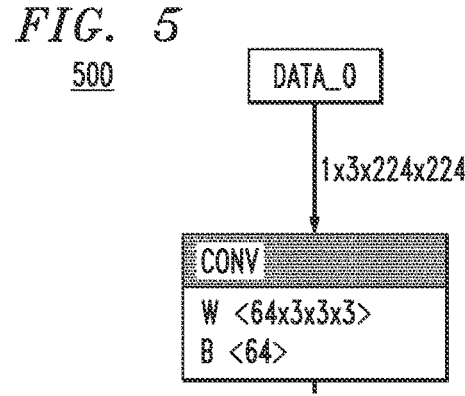
FIG. 5 illustrates an inference result of a convolution computation associated with a memory management process in an inference framework with which one or more illustrative embodiments can be implemented.

First, as part of step 302, the inference framework needs to parse the model to generate the computation graph with each computation indicated by node numbers of the computation node and parameter nodes. For example, FIG. 4 shows a portion of a computation graph 400 of a SqueezeNet model. In FIG. 4, for example, assume a given convolution (Cony) computation corresponds to a computation node 20 (op #20) with parameter nodes 80, 14, and 87. Assume further that parameter node 14 is the pre-trained immutable parameter, 80 is the mutable input from a given UE (102 in FIG. 1) and 87 is the mutable computing result which is the input to Add computation (op #21). Thereafter, the framework infers the shapes of each parameter of each computation. FIG. 5 shows an inference result 500 of the cony computation referred to above in computation graph 400 of FIG. 4. More particularly, FIG. 5 shows that the input 80 from the UE has the shape [1, 3, 224, 224] and node 14 from the pre-trained model has the shape [64, 3, 3, 3].

As part of step 304, the framework builds two tables, i.e., one for each computation defined in the model and one for each parameter (immutable or mutable) used by the computations. The framework then associates these two tables with which computation will use which parameters. FIG. 6 shows a memory model 600 which is an example of the two tables and the associations (denoted by shaded arrows). From FIG. 6, it is evident that computation node 20 has parameter nodes 80, 14, and 87; computation node 17 has parameter nodes 80, 12, and 82, with node 80 shared with computation node 20; and computation node 21 has parameter nodes 87, 15 and 88, with node 87 shared with computation node 20 (nodes 15, 88 are not shown in FIG. 6).

As part of step 306, the framework allocates GPU memory for each parameter, based on its shape information as explained above. For example, as mentioned above with regard to FIG. 5, node 14 has the shape [64, 3, 3, 3], therefore, the memory needs for this node require a memory size of 64×3×3×3×sizeof(float)=6192. FIG. 7 shows the memory model, i.e., memory model 700, following step 306.

As part of step 308, the framework extracts the pre-trained parameter from the model and copies it into the GPU memory allocated for this chunk of the parameter.

As part of step 310, the framework then adjusts the pointer values in the parameter table so that the pointer points to appropriate parameters in the GPU memory, as shown in model memory 800 of FIG. 8.

As mentioned above, since version 10.2 of the toolkit, CUDA has provided support for low-level virtual memory management and memory sharing between different processes. FIG. 9 shows a CUDA-based workflow 900 to share physical GPU memory between different processes, e.g., a host process 910 and a guest process 920.

In the host process 910:

1. The host process 910 allocates the GPU memory and transforms it into an exportable handle (initialize the GPU memory handle).
2. The host process 910 calls cuMemCreate with the handle and the preferred memory size.
3. The host process 910 calls cuMemExportToShareable-Handle upon this handle so that this handle can be exported to other processes.
4. The host process 910 creates a UNIX socket and waits for the connection from the guest process 920.
5. After connected, the host process 910 sends the handle and the memory size to the guest process 920 via the UNIX socket.

In the guest process 920:

1. The guest process 920 creates a UNIX socket and connects it to the host process 910.
2. After connected, the guest process 920 receives the handle and the memory size from the host process 910 via the UNIX socket.
3. The guest process 920 calls cuMemAddressReserve with appropriate size to reserve the memory space from the operating system (OS).
4. The guest process 920 calls cuMemImportFromShare-ableHandle to import the handle received from the host process 910.
5. The guest process 920 calls cuMemMap to map the shared physical memory to the reserved memory space.
6. The guest process 920 calls cuMemSetAccess on this memory space to enable access.

Following workflow 900, the guest process 920 can access the virtual address (backed up by the shared GPU physical memory) the same way as it accesses the GPU memory address returned by cudaDeviceAlloc when the guest process 920 directly allocates memory in GPU itself and no shared memory is used.

While the above examples are for a specific model framework, and implementation details may differ between frameworks, the following conventional principles are the same:

1. The pre-trained immutable parameters account for the most memory requirement.
2. The requirement for the memory and computing resources are not balanced.
3. The framework does not differentiate the parameters which are immutable or mutable.

Such common principles attributable to conventional deep learning model frameworks lead to many challenges.

In distributed and parallel deep learning, the framework keeps all parameters inside the GPU for each worker, so that each worker can work on its own set of parameters to save the synchronization cost between different workers when the parameters are updated by the gradients. But this model is also reused in inference, which does not make sense. In inference, the parameters are immutable and there is no need to update them anymore, so the parameters can be shared between different workers very safely.

In the multiple inference instances deployment models, each data parallelism inference application is working in different processes independently and has the entire model in replication. However, the computing resources are shared among different computations in the same instance and between different instances and are allocated and reclaimed for each active computation. This aggregates the unbalance between the memory and computation requirements.

The conventional framework treats all parameters, i.e., the input, the output, the intermediate computation result, and the pre-trained parameters without differentiation. This makes sense in training, as all parameters are mutable. But in inference, such common treatment eliminates the possibility of further performance optimizations.

Figure 10:
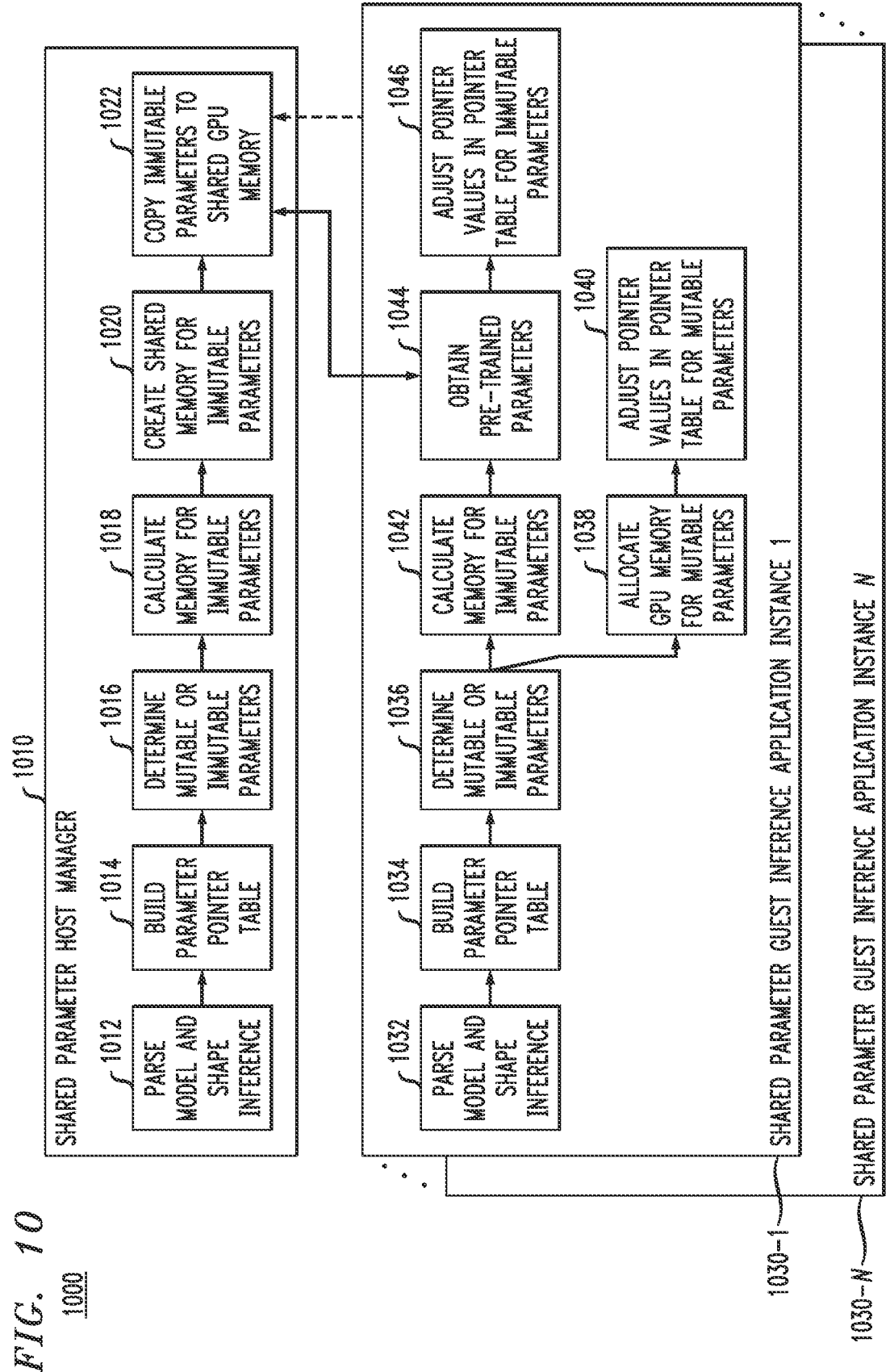
FIG. 10 illustrates a process for model parameter sharing between inference application instances according to an illustrative embodiment.

Illustrative embodiments overcome the above and other challenges by providing model parameter sharing techniques as will be explained in further detail herein. FIG. 10 illustrates a process architecture 1000 for model parameter sharing between inference application instances according to an illustrative embodiment. As shown in model parameter sharing process architecture 1000, a shared parameter host manager 1010 (i.e., a first or host process) executes steps 1012 through 1022, while a plurality of shared parameter guest inference application instances 1030-1, . . . , 1030-N (i.e., second or guest process(es)) each execute steps 1032 through 1046. Note that FIG. 10 only shows process details for one inference instance (shared parameter guest inference application instance 1030-1) for clarity, however, it is to be understood that each of the one or more other instances (of the plurality of N instances) have the same process architecture and obtain immutable parameters from the shared GPU memory created by the parameter host manager 1010, as will be further explained. Thus, as used herein below, reference to any of the shared parameter guest inference application instances 1030-1, . . . , 1030-N will be generally referred to as shared parameter guest inference application instance 1030.

Model parameter sharing process architecture 1000 treats model mutable parameters (the input, the output, and the intermediate computation result) and immutable parameters (pre-trained parameters) differently, as will be further explained below. Shared parameter host manager 1010 creates shared memory for all pre-trained parameters in a single chunk of GPU physical memory instead of each allocation for each parameter to avoid memory fragment. The shared parameter guest inference application instance 1030 does not allocate the memory for pre-trained parameters, but rather it obtains the immutable parameters from the shared parameter host manager 1010.

Starting with the shared parameter host manager 1010, steps 1012 and 1014 are executed the same, respectively, as steps 302 and 304 in FIG. 3. That is, in step 1012, the shared parameter host manager 1010 parses the model to generate the computation graph with each computation indicated by node numbers of the computation nodes and parameter nodes. In step 1014, the shared parameter host manager 1010 then builds a memory model comprising a computation table and a parameter table (parameter pointer table), as explained above.

In step 1016, shared parameter host manager 1010 differentiates (determines) if a parameter is mutable or immutable. In step 1018, shared parameter host manager 1010 collects information for the immutable parameters in order to calculate how much memory is needed to store these parameters and create a block of shared memory for these parameters. In step 1020, shared parameter host manager 1010 creates the shared memory for the immutable parameters and, in step 1022, extracts the immutable parameters from the model and copies them into the GPU shared memory. Thereafter, the shared parameter host manager 1010 can drop all built tables and only needs to keep the shared memory exportable handle and wait in the UNIX socket for the connection from the shared parameter guest inference application instance 1030 to deliver the shared memory handle.

Turning now to the process architecture of each shared parameter guest inference application instance 1030, steps 1032 and 1034 are executed the same, respectively, as steps 302 and 304 in FIG. 3 (and steps 1012 and 1014 of shared parameter host manager 1010). That is, in step 1032, shared parameter guest inference application instance 1030 parses the model to generate the computation graph with each computation indicated by node numbers of the computation nodes and parameter nodes. In step 1034, shared parameter guest inference application instance 1030 then builds a memory model comprising a computation table and a parameter table (parameter pointer table), as explained above. In step 1036, shared parameter guest inference application instance 1030 differentiates if a parameter is mutable or immutable (the same as step 1016 of shared parameter host manager 1010).

Shared parameter guest inference application instance 1030 processes mutable parameters in the same way that process 300 of FIG. 3 processes all (both mutable and immutable) model parameters, i.e., allocate GPU memory for mutable parameters in step 1038 and adjusts pointer values in the pointer table for mutable parameters in step 1040.

However, for immutable parameters, shared parameter guest inference application instance 1030 calculates memory size needed for the immutable parameters in step 1042. Then, instead of allocating GPU memory (e.g., calling cudaDeviceAlloc to allocate the GPU memory itself), shared parameter guest inference application instance 1030 in step 1044 calls GetImmutableParameters to obtain the immutable parameters hosted in the GPU shared memory created by shared parameter host manager 1010 (steps 1020/1022). Thereafter, in step 1046, shared parameter guest inference application instance 1030 adjusts the pointer values in the parameter pointer table as explained above.

Figure 11:
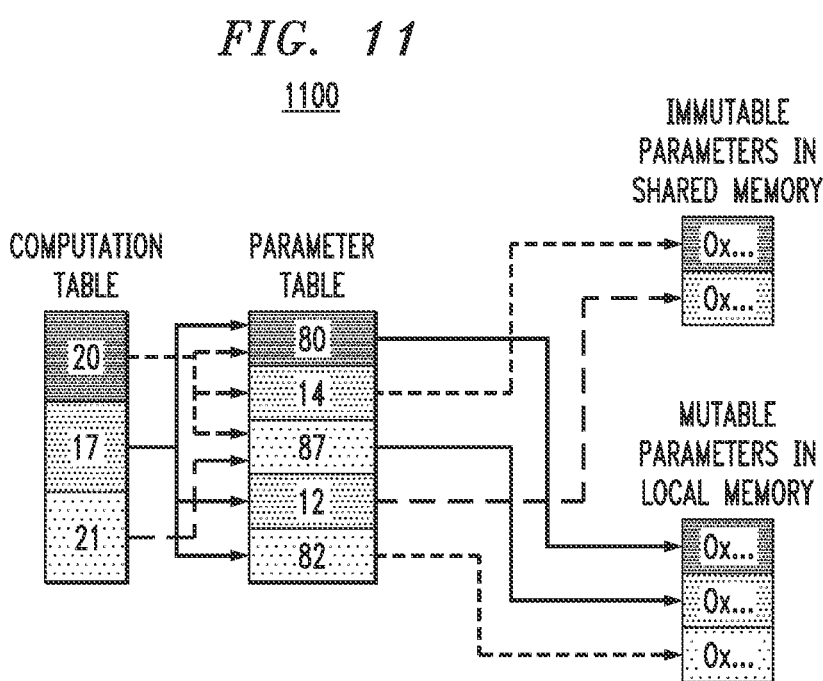
FIG. 11 illustrates adjustment of pointers to memory in a process for model parameter sharing between inference application instances according to an illustrative embodiment.

FIG. 11 shows a memory model 1100 with a parameter pointer table from the shared parameter guest inference application instance 1030 point of view. As shown, immutable parameters are pointed to in the GPU shared memory created by shared parameter host manager 1010 while mutable parameters are pointed to in the local memory created by shared parameter guest inference application instance 1030. Advantageously, by utilizing the GPU shared memory to store one copy of the immutable parameters, each shared parameter guest inference application instance 1030 can use the pre-trained parameters from the GPU shared memory just as if it had allocated the immutable parameter memory itself.

While in illustrative embodiments, process architecture 1000 is implemented on one GPU (one processing) of an edge server, alternative embodiments can be scaled out to multiple GPUs so that immutable parameters are hosted in one GPU and all other GPUs are used for local mutable parameters. It is understood, however, that such alternative embodiments should account for data movement across a PCIe bus or an NVLink so as to address any performance penalty.

Illustrative embodiments are typically used in application instances with the same model in inference. That is, after the model is trained, there is no writing on the pre-trained parameters, so there is no synchronization between simultaneous reading/writing access. As there is only one active computation at any time, the chance is minimal that multiple inference application instances 1030 will access the same parameter in the same chunk of memory. However, in alternative embodiments, a contention-relief mechanism for addressing simultaneous or near simultaneous parameter access by two or more inference application instances 1030 may be employed.

In illustrative embodiments, while parameters (immutable or mutable) are hosted in the GPU and there is no input/output (IO) between GPU memory and CPU memory, there is no IO limitation for multiple access from multiple inference application instances 1030.

Figure 12:
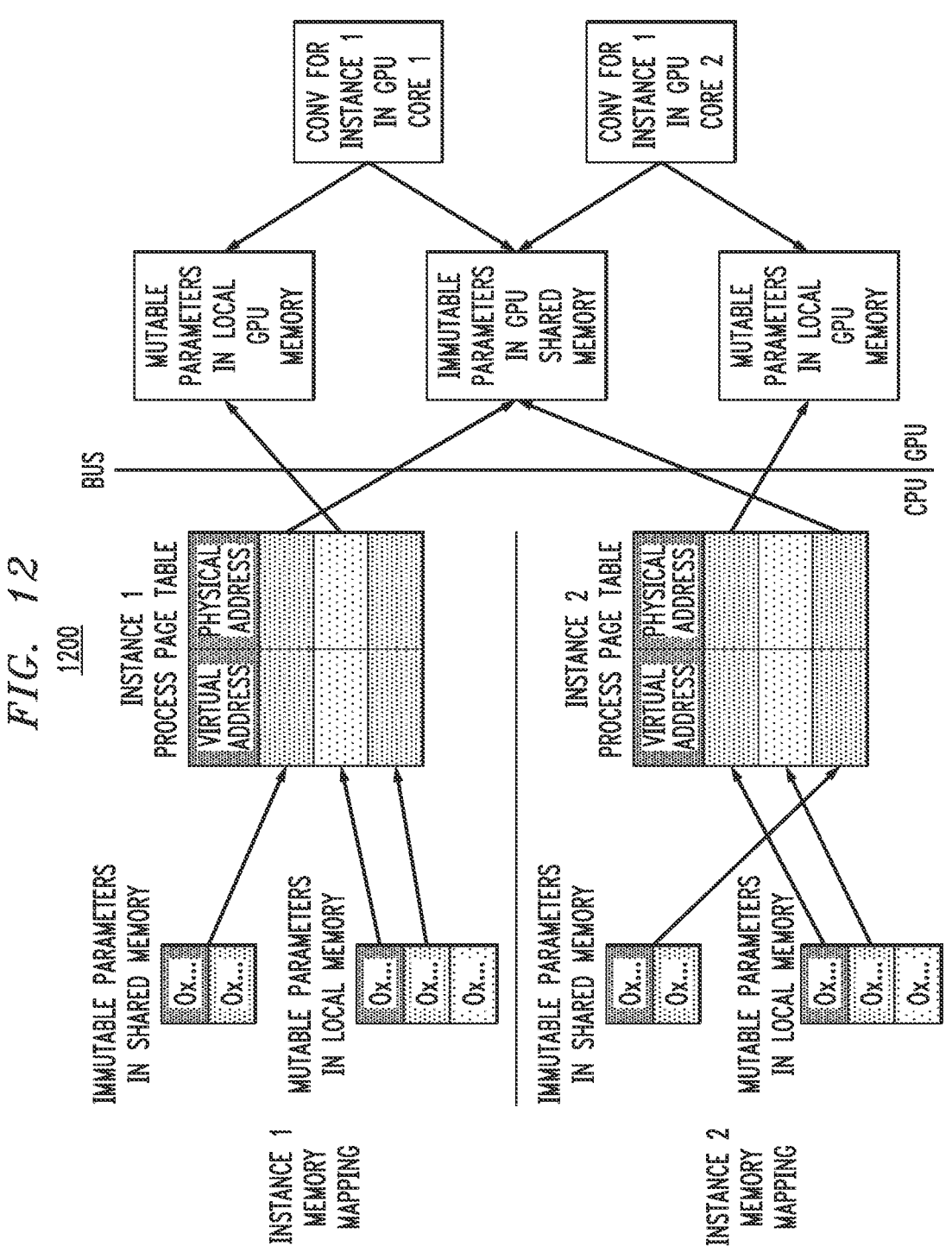
FIG. 12 illustrates multiple inference application instance execution and memory mapping in a process for model parameter sharing between inference application instances according to an illustrative embodiment.

As shown in memory mapping view 1200 of FIG. 12, immutable parameters are backed up by the same GPU physical pages created inside the GPU and the mutable parameters are backed up by different GPU memory pages for different inference application instances. However, either immutable or mutable parameters are inside the GPU, and computations from all inference application instances are executed in the GPU as well. Thus, during computation, there is no IO between the CPU memory and GPU memory. The virtual address inside the instance process memory space is only used to address the parameters of the computation without actually reading/writing accesses.

Advantageously, illustrative embodiments provide many advantages in AI model management environments. For example, illustrative embodiments treat immutable and mutable parameters differently so that inference performance can be further optimized.

Furthermore, this differentiation can not only be used in multiple inference application instances in a data parallelism paradigm but also with intelligent parameter scheduling in model parallelism and pipeline parallelism paradigms.

Illustrative embodiments also multiply GPU capacity by optimizing both memory and thread utilizations. For example, recall the model represented in computation graph 400 of FIG. 4. In this model, immutable parameters require 14.7 G memory size. For a 32 G GPU, using conventional approaches, only one inference application instance can be deployed without penalizing performance. Alternatively, at most two inference application instances with some performance penalty can be deployed with conventional approaches, i.e., pre-trained (immutable) parameters require 2×14.7=29.4 G memory and all 2×1.9=3.8 G mutable parameters require the remaining 32−29.4=2.6 G memory with dynamic allocation for the mutable parameters, with $$\frac{3.8 - 2.6}{3.8} \approx 30\%$$

swapping in and out the mutable parameters out of the device memory, which will result in a severe performance penalty.

In contrast, illustrative embodiments use 14.7 G memory for the immutable parameters and the remaining 17.3 G memory for the mutable parameters, such that $$\frac{17.3}{1.9} = 9$$

inference application instances can be deployed in a single GPU. Then with illustrative embodiments, the GPU capacity is multiplied by $$\frac{9}{2} = 4.5$$

times with better performance (without swapping in/out) or $$\frac{9}{1} = 9$$

times with the same performance.

Still further, illustrative embodiments can be implemented with minor changes to current frameworks, so the model parameter sharing techniques described herein can be easily integrated into current deep learning frameworks.

FIG. 13 illustrates a methodology 1300 as part of a first process for model parameter sharing between inference model (application) instances according to an illustrative embodiment. In step 1302, the methodology 1300 obtains a representation (e.g., computation graph) of an inference model for which multiple instances of the inference model are to be executed on at least one processing unit (e.g., at least one GPU). In step 1304, the methodology 1300 determines, from the representation of the inference model, one or more model parameters that are a pre-trained type of model parameter. In step 1306, the methodology 1300 allocates a shared memory for storing the one or more model parameters that are the pre-trained type of model parameter. In step 1308, the methodology 1300 stores the one or more model parameters that are the pre-trained type of model parameter in the shared memory for access by the multiple instances of the inference model to be executed on the at least one processing unit.

FIG. 14 illustrates a block diagram of an example processing platform or, more generally, an information processing system 1400 that can be used to implement illustrative embodiments. For example, one or more components in FIGS. 1-13 can comprise a processing configuration such as that shown in FIG. 14 to perform steps described above in the context of FIGS. 1-13. Note that while the components of system 1400 are shown in FIG. 14 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 1400 can include multiple processing devices, each of which comprise the components shown in FIG. 14.

As shown, the system 1400 includes a central processing unit (CPU) 1401 which performs various appropriate acts and processing, based on a computer program instruction stored in a read-only memory (ROM) 1402 or a computer program instruction loaded from a storage unit 1408 to a random access memory (RAM) 1403. The RAM 1403 stores therein various programs and data required for operations of the system 1400. The CPU 1401, the ROM 1402 and the RAM 1403 are connected via a bus 1404 with one another. An input/output (I/O) interface 1405 is also connected to the bus 1404.

The following components in the system 1400 are connected to the I/O interface 1405, comprising: an input unit 1406 such as a keyboard, a mouse and the like; an output unit 1407 including various kinds of displays and a loudspeaker, etc.; a storage unit 1408 including a magnetic disk, an optical disk, and etc.; a communication unit 1409 including a network card, a modem, and a wireless communication transceiver, etc. The communication unit 1409 allows the system 1400 to exchange information/data with other devices through a computer network such as the Internet and/or various kinds of telecommunications networks.

Various processes and processing described above may be executed by the processing unit 1401. For example, in some embodiments, methodologies described herein may be implemented as a computer software program that is tangibly included in a machine readable medium, e.g., the storage unit 1408. In some embodiments, part or all of the computer programs may be loaded and/or mounted onto the system 1400 via ROM 1402 and/or communication unit 1409. When the computer program is loaded to the RAM 1403 and executed by the CPU 1401, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/ or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:

at least one memory storing program code; and at least one processing platform comprising at least one processor coupled to the at least one memory, the at least one processing platform, when executing the program code, is configured to:

obtain, via a first process, an inference model for which multiple instances of the inference model are to be executed on at least one processing unit;

differentiate, using a host manager, from the inference model, via the first process, one or more model parameters that are a pre-trained type of model parameter, the differentiating comprising:

parsing the inference model;

generating a computation table for each computation of a plurality of computations defined in the inference model, the computation table comprising a plurality of computation nodes, the computation nodes comprising computation node numbers;

generating a parameter table for each parameter used by the plurality of computations, the parameter table comprising a plurality of parameter nodes, the parameter nodes comprising parameter node numbers, wherein each computation of the plurality of computations is indicated by a computation node number of the computation table and one or more parameter node numbers of the parameter table;

generating a memory model and associating the computation table and the parameter table using the generated memory model to determine one or more parameter node numbers of the parameter table associated with each computation node number of the plurality of computations, and wherein one or more parameter nodes of the plurality of parameter nodes are associated with two or more computation nodes of the plurality of computation nodes;

inferring a shape of each parameter node of each computation; and identifying the one or more model parameters that are the pre-trained type of model parameter;

determine, using the host manager, based on the inferred shape of the parameter nodes that are identified as the one or more model parameters that are the pre-trained type of model parameter, an amount of memory to store the one or more model parameters that are the pre-trained type of model parameter in a shared memory storage space;

allocate, via the first process, a shared memory of the shared memory storage space corresponding to the amount of memory for storing the one or more model parameters that are the pre-trained type of model parameter;

extract, using the host manager, the one or more model parameters that are the pre-trained type of model parameter from the inference model;

store, via the first process, the one or more model parameters that are the pre-trained type of model parameter in the shared memory for access by the multiple instances of the inference model to be executed on the at least one processing unit; and permit access to the shared memory of the shared memory storage space created by the first process to allow the multiple instances of the inference model to utilize the one or more model parameters that are the pre-trained type of model parameter in the shared memory of the shared memory storage space while executing the inference model.

2. The apparatus of claim 1, wherein the at least one processing platform, when executing the program code, is further configured to:

obtain, via a second process associated with a given one of the multiple instances of the inference model, the inference model;

determine from the inference model, via the second process, one or more model parameters that are not the pre-trained type of model parameter;

allocate, via the second process, a local memory for storing the one or more model parameters that are not the pre-trained type of model parameter; and store, via the second process, the one or more model parameters that are not the pre-trained type of model parameter in the local memory for the given one of the multiple instances of the inference model.

3. The apparatus of claim 2, wherein the at least one processing platform, when executing the program code, is further configured to adjust one or more pointers to point to the local memory.

4. The apparatus of claim 2, wherein the at least one processing platform, when executing the program code, is further configured to adjust pointers to point to the shared memory of the shared memory storage space.

5. The apparatus of claim 2, wherein the one or more model parameters that are the pre-trained type of model parameter comprise one or more immutable model parameters, and the one or more model parameters that are not the pre-trained type of model parameter comprise one or more mutable model parameters.

6. The apparatus of claim 2, wherein the first process comprises a host process and the second process comprises a guest process.

7. The apparatus of claim 1, wherein the at least one processing unit comprises at least one graphic processing unit.

8. The apparatus of claim 7, wherein the at least one graphic processing unit is part of an edge computing network.

9. The apparatus of claim 1, wherein each of the multiple instances of the inference model are configured to receive and process data sets received from multiple users.

10. The apparatus of claim 1, wherein the inference model comprises a deep learning model.

11. A method, comprising:
   obtaining, via a first process, an inference model for which multiple instances of the inference model are to be executed on at least one processing unit;
   differentiating, using a host manager, from the inference model, via the first process, one or more model parameters that are a pre-trained type of model parameter, the differentiating comprising:
   parsing the inference model;
   generating a computation table for each computation of a plurality of computations defined in the inference model, the computation table comprising a plurality of computation nodes, the computation nodes comprising computation node numbers;
   generating a parameter table for each parameter used by the plurality of computations, the parameter table comprising a plurality of parameter nodes, the parameter nodes comprising parameter node numbers, wherein each computation of the plurality of computations is indicated by a computation node number of the computation table and one or more parameter node numbers of the parameter table;
   generating a memory model and associating the computation table and the parameter table using the generated memory model to determine one or more parameter node numbers of the parameter table associated with each computation node number of the plurality of computations, and wherein one or more parameter nodes of the plurality of parameter nodes are associated with two or more computation nodes of the plurality of computation nodes;
   inferring a shape of each parameter node of each computation; and
   identifying the one or more model parameters that are the pre-trained type of model parameter;
   determining, using the host manager, based on the inferred shape of the parameter nodes that are identified as the one or more model parameters that are the pre-trained type of model parameter, an amount of memory to store the one or more model parameters that are the pre-trained type of model parameter in a shared memory storage space;
   allocating, via the first process, a shared memory of the shared memory storage space corresponding to the amount of memory for storing the one or more model parameters that are the pre-trained type of model parameter;
   extracting, using the host manager, the one or more model parameters that are the pre-trained type of model parameter from the inference model;
   storing, via the first process, the one or more model parameters that are the pre-trained type of model parameter in the shared memory for access by the multiple instances of the inference model to be executed on the at least one processing unit; and
   permitting access to the shared memory of the shared memory storage space created by the first process to allow the multiple instances of the inference model to utilize the one or more model parameters that are the pre-trained type of model parameter in the shared memory of the shared memory storage space while executing the inference model.

12. The method of claim 11, further comprising:
   obtaining, via a second process associated with a given one of the multiple instances of the inference model, the inference model;
   determining from the inference model, via the second process, one or more model parameters that are not the pre-trained type of model parameter;
   allocating, via the second process, a local memory for storing the one or more model parameters that are not the pre-trained type of model parameter; and
   storing, via the second process, the one or more model parameters that are not the pre-trained type of model parameter in the local memory for the given one of the multiple instances of the inference model.

13. The method of claim 12, further comprising adjusting one or more pointers to point to the local memory.

14. The method of claim 12, further comprising adjusting pointers to point to the shared memory of the shared memory storage space.

15. A computer program product stored on a non-transitory computer-readable medium and comprising machine executable instructions, the machine executable instructions, when executed, causing a processing platform to:
   obtain, via a first process, an inference model for which multiple instances of the inference model are to be executed on at least one processing unit;
   differentiate, using a host manager, from the inference model, via the first process, one or more model parameters that are a pre-trained type of model parameter, the differentiating comprising:
   parsing the inference model;
   generating a computation table for each computation of a plurality of computations defined in the inference model, the computation table comprising a plurality of computation nodes, the computation nodes comprising computation node numbers;
   generating a parameter table for each parameter used by the plurality of computations, the parameter table comprising a plurality of parameter nodes, the parameter nodes comprising parameter node numbers, wherein each computation of the plurality of computations is indicated by a computation node number of the computation table and one or more parameter node numbers of the parameter table;
   generating a memory model and associating the computation table and the parameter table using the generated memory model to determine one or more parameter node numbers of the parameter table associated with each computation node number of the plurality of computations, and wherein one or more parameter nodes of the plurality of parameter nodes are associated with two or more computation nodes of the plurality of computation nodes;
   inferring a shape of each parameter node of each computation; and
   identifying the one or more model parameters that are the pre-trained type of model parameter;

determine, using the host manager, based on the inferred shape of the parameter nodes that are identified as the one or more model parameters that are the pre-trained type of model parameter, an amount of memory to store the one or more model parameters that are the pre-trained type of model parameter in a shared memory storage space;

allocate, via the first process, a shared memory of the shared memory storage space corresponding to the amount of memory for storing the one or more model parameters that are the pre-trained type of model parameter;

extract, using the host manager, the one or more model parameters that are the pre-trained type of model parameter from the inference model;

store, via the first process, the one or more model parameters that are the pre-trained type of model parameter in the shared memory for access by the multiple instances of the inference model to be executed on the at least one processing unit; and permit access to the shared memory of the shared memory storage space created by the first process to allow the multiple instances of the inference model to utilize the one or more model parameters that are the pre-trained type of model parameter in the shared memory of the shared memory storage space while executing the inference model.

16. The computer program product of claim 15, wherein the processing platform is further caused to:

obtain, via a second process associated with a given one of the multiple instances of the inference model, the inference model;

determine from the inference model, via the second process, one or more model parameters that are not the pre-trained type of model parameter;

allocate, via the second process, a local memory for storing the one or more model parameters that are not the pre-trained type of model parameter; and store, via the second process, the one or more model parameters that are not the pre-trained type of model parameter in the local memory for the given one of the multiple instances of the inference model.

17. The computer program product of claim 16, wherein the one or more model parameters that are the pre-trained type of model parameter comprise one or more immutable model parameters, and the one or more model parameters that are not the pre-trained type of model parameter comprise one or more mutable model parameters.

18. The method of claim 12, wherein the one or more model parameters that are the pre-trained type of model parameter comprise one or more immutable model parameters, and the one or more model parameters that are not the pre-trained type of model parameter comprise one or more mutable model parameters.

19. The computer program product of claim 16, wherein the processing platform is further caused to adjust one or more pointers to point to the local memory.

20. The computer program product of claim 16, wherein the processing platform is further caused to adjust pointers to point to the shared memory of the shared memory storage space.

* * * * *